United States Patent
Kawasaki et al.

(10) Patent No.: US 8,597,835 B2
(45) Date of Patent: Dec. 3, 2013

(54) POSITIVE-ELECTRODE MATERIAL FOR A LITHIUM ION SECONDARY BATTERY AND MANUFACTURING METHOD OF THE SAME

(75) Inventors: Takashi Kawasaki, Omuta (JP); Hiroshi Sakashita, Omuta (JP); Takehiko Sawai, Tsu (JP); Shinji Saito, Tsu (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/473,071

(22) Filed: May 16, 2012

(65) Prior Publication Data

US 2012/0258363 A1  Oct. 11, 2012

Related U.S. Application Data

(63) Continuation of application No. PCT/JP2010/068379, filed on Oct. 19, 2010.

(30) Foreign Application Priority Data

Nov. 18, 2009  (JP) ................................ 2009-263035

(51) Int. Cl.
*H01M 4/58* (2010.01)
*H01B 1/04* (2006.01)

(52) U.S. Cl.
USPC .................. 429/231.95; 429/218.1; 429/221; 429/231.8; 252/502; 252/506

(58) Field of Classification Search
USPC ...................... 429/218.1, 221, 231.8, 231.95; 252/502, 506
See application file for complete search history.

(56) References Cited

U.S. PATENT DOCUMENTS

| | | | |
|---|---|---|---|
| 5,631,100 A | 5/1997 | Yoshino et al. | |
| 2002/0047112 A1 | 4/2002 | Hosoya et al. | |
| 2002/0102459 A1 | 8/2002 | Hosoya et al. | |
| 2010/0009256 A1* | 1/2010 | Kusachi et al. | 429/213 |
| 2011/0020703 A1* | 1/2011 | Suzuki et al. | 429/221 |
| 2012/0251889 A1* | 10/2012 | Janssen et al. | 429/231.8 |

FOREIGN PATENT DOCUMENTS

| | | | |
|---|---|---|---|
| CN | 101090154 | * | 12/2007 |
| JP | 5-226004 A | | 9/1993 |
| JP | 9-134724 A | | 5/1997 |
| JP | 2000-509193 A | | 7/2000 |
| JP | 2001-126733 A | | 5/2001 |
| JP | 2002-75364 A | | 3/2002 |
| JP | 2002-110162 A | | 4/2002 |
| JP | 2003-168429 A | | 6/2003 |
| JP | 2004-63386 A | | 2/2004 |
| JP | 2005-19399 A | | 1/2005 |
| JP | 2005-123107 A | | 5/2005 |
| JP | 2005-135723 A | | 5/2005 |
| JP | 2006-302671 A | | 11/2006 |
| JP | 2007-35295 A | | 2/2007 |
| JP | 2007-80652 A | | 3/2007 |
| JP | 2008-117749 A | | 5/2008 |
| JP | 2009-503182 A | | 1/2009 |
| JP | 2009-533799 A | | 9/2009 |
| WO | 97/40541 A1 | | 10/1997 |
| WO | 2007/013678 A2 | | 2/2007 |
| WO | 2007/116363 A2 | | 10/2007 |

OTHER PUBLICATIONS

CN 101090154—Translation.*
Peigney et al. Specific surface area of carbon nanotubes and bundles of carbon nanotubes, Carbon 39 (2001) 507-514.*
Smith et al. "Surface Area and Properties of Carbon Black", Ind. Eng. Chem., 1941, 33 (10), pp. 1303-1307.*
Britton, "Evaluation and Testing of Commercially-Available Carbon Nanotubes as Negative Electrodes for Lithium Ion Battery" NASA/TM, May 2007.*
International Search Report issued in PCT/JP2010/068379 dated Dec. 14, 2010.

* cited by examiner

*Primary Examiner* — Patrick Ryan
*Assistant Examiner* — Ladan Mohaddes
(74) *Attorney, Agent, or Firm* — Novak Druce Connolly Bove + Quigg LLP

(57) ABSTRACT

Provided is a positive electrode material for a safe, high capacity, long lifetime lithium ion secondary battery capable of large current charging and discharging. The positive electrode material contains between 5% by mass or more and 30% by mass or less of a carbon black composite formed by joining together fibrous carbon and carbon black wherein ash is 1.0% or less by mass in accordance with JIS K 1469 and the remainder includes olivine-type lithium iron phosphate, and volatile oxygen-containing functional groups which constitutes 1.0% or less by mass of the positive electrode material. The fibrous carbon is preferably a nanotube having a fiber diameter of 5 nm or more and 50 nm or less and a specific surface area between 50 $m^2/g$ or more and 400 $m^2/g$ or less.

11 Claims, No Drawings

POSITIVE-ELECTRODE MATERIAL FOR A LITHIUM ION SECONDARY BATTERY AND MANUFACTURING METHOD OF THE SAME

CROSS-REFERENCE TO RELATED APPLICATIONS

This application is based upon and claims the benefit of priority from the prior Japanese Patent Application No. 2009-263035, filed on Nov. 18, 2009 and PCT International Application PCT/JP2010/068379, filed on Oct. 19, 2010, the entire contents of which are incorporated herein by reference.

FIELD

The present invention is related to a positive-electrode material for a lithium ion secondary battery.

BACKGROUND

A lithium ion secondary battery which forms a negative electrode using a material capable of lithium ion storage and discharge can control the deposition of dendrite compared to a lithium battery which forms a negative electrode using metal lithium. As a result, it is possible to provide a battery which has a high capacity and high density of energy which can prevent battery short and improve safety.

In recent years, while further high capacity is being demanded for lithium ion secondary batteries, improvements in large current charging and discharging capabilities due to a reduction in battery resistance are being demanded for a battery for use in power systems. Conventionally, efforts have been made to achieve this by increasing high capacity of a lithium metal oxide positive electrode material or carbon group negative electrode material itself which are battery reactive materials, a reduction in the particle diameter of these reactive material particles, an increase in electrode area using particle specific surface area or battery design and further, a reduction in liquid diffusion resistance using thinner separators. However, this leads to an increase in a binder due to small particle diameter or an increase in specific surface area which adversely affects high capacity, and because positive/negative electrode materials peel from or fall off metal foil, which is an electric collector, causing battery internal shorts, and safety of lithium ion secondary batteries is lost due to a drop in battery voltage resistance or dramatic thermal runaway. Thus, changes in the type of binder used in order to increase binding abilities with a foil were examined in Japanese Laid Open Patent H5-226004.

However, by changing the type of binder, capacity can be increased, but improvement of large current charging and discharging capabilities due to a reduction in resistance of a binder is insufficient, and development for use in electrical power tools or hybrid cars which require large current charging and discharging which is a large function impairment in lithium ion secondary batteries compared to secondary batteries such as a nickel-cadmium battery or nickel-hydride battery was difficult.

In addition, efforts have been made using carbon conductive materials with the goal of reducing electrode resistance with respect to large current charging and discharging of lithium ion secondary batteries in Japanese Laid Open Patent 2005-19399, Japanese Laid Open Patent 2001-126733 and Japanese Laid Open Patent 2003-168429. However, when a charging and discharging cycle using a large current is repeated, a conductivity pass of particles between positive/negative electrodes is lost due to expansion and contraction of a positive/negative electrode material and as a result, a large current rapidly no longer flows which is a problem.

On the other hand, in recent years, olivine-type lithium iron phosphate ($LiFePO_4$) has been attracting attention as a positive electrode material for a lithium ion battery considering the importance of safety and costs. However, this material has a large resistance and reducing this resistance has become a large problem in Japanese Translation of PCT International Publication 2000-509193 and Japanese Laid Open Patent H9-134724.

In order to solve the problem of olivine-type lithium iron phosphate described above, various examinations have been performed to make a positive electrode material by a composite of olivine-type lithium iron phosphate and black carbon which is a conductive material in Japanese Laid Open Patent 2002-75364, Japanese Laid Open Patent 2002-110162, Japanese Laid Open Patent 2004-63386, Japanese Laid Open Patent 2005-123107, Japanese Laid Open Patent 2005-302671 and Japanese Laid Open Patent 2007-80652. The capabilities of a positive electrode material have been improved using an olivine-type lithium iron phosphate as a result of these examinations, however, high capabilities equal to or higher than already existing positive electrode materials for a lithium ion secondary battery have yet to be achieved. Japanese Translation of PCT International Publication 2009-503182 is also referred as a prior art document.

SUMMARY

The present invention was invented in order to deal with the problems associated with a positive electrode material for a lithium ion secondary battery and aims to provide a positive electrode material for a lithium ion secondary battery which can maintain large current charging and discharging over a long lifetime.

That is, the present invention adopts the following means for solving the problems described above.

(1) A positive electrode material for a lithium ion secondary battery comprising 5% by mass or more and 30% by mass or less of a carbon black composite formed by joining together fibrous carbon and carbon black wherein ash is 1.0% or less by mass in accordance with JIS K 1469 and the remainder includes olivine-type lithium iron phosphate and wherein the material contains a volatile oxygen-containing functional group which constitutes 1.0% or less by mass of the positive electrode material.

(2) The positive electrode material for a lithium ion secondary battery described in (1), wherein the fibrous carbon is a carbon nanotube having a fiber diameter of 5 nm or more and 50 nm or less and a specific surface area of 50 $m^2/g$ or more and 400 $m^2/g$ or less.

(3) The positive electrode material for a lithium ion secondary battery described in (1) or (2) wherein a specific surface area of the carbon black is less than the specific surface area of the fibrous carbon and is 10 $m^2/g$ or more and 200 $m^2/g$ or less.

(4) The positive electrode material for a lithium ion secondary battery described in any one of (1) to (3), wherein a ratio of the carbon black with respect to the contained fibrous carbon is a mass ratio of 30/70 or more and 95/5 or less.

(5) The positive electrode material for a lithium ion secondary battery described in any one of (1) to (4), wherein a primary particle diameter of the olivine-type lithium iron phosphate is 10 nm or more and 300 nm or less.

(6) The positive electrode material for a lithium ion secondary battery described in any one of (1) to (4), wherein a primary particle diameter of the olivine-type lithium iron phosphate is 50 nm or more and 200 nm or less.

(7) The positive electrode material for a lithium ion secondary battery described in any one of (1) to (6), wherein the contained amount of the carbon black composite is 8% by mass or more and 20% by mass or less.
(8) The positive electrode material for a lithium ion secondary battery described in (1), wherein the fibrous carbon is a carbon nanotube having a fiber diameter of 5 nm or more and 130 nm or less and a specific surface area of 100 m$^2$/g or more and 300 m$^2$/g or less.
(9) The positive electrode material for a lithium ion secondary battery described in any one of (1) to (8), wherein the carbon black is acetylene black.
(10) A lithium ion secondary battery comprising a positive electrode formed by using a positive electrode material for a lithium ion secondary battery which includes 5% by mass or more and 30% by mass or less of a carbon black composite formed by joining together fibrous carbon and carbon black wherein ash is 1.0% by mass in accordance with JIS K 1469 and the remainder includes olivine-type lithium iron phosphate and wherein the material contains a volatile oxygen-containing functional group which constitutes 1.0% or less by mass of the positive electrode material; a negative electrode; an electrolyte; and a separator which insulates the positive electrode and the negative electrode and which retains the electrolyte.
(11) The lithium ion secondary battery described in (10), wherein the separator is a porous film shape.
(12) A method of manufacturing a positive electrode material for a lithium ion secondary battery comprising mixing olivine-type lithium iron phosphate after or at the same time as joining fibrous carbon and carbon black together; and heating at a temperature of 200° C. or more and 900° C. or less under a vacuum or inactive atmosphere.
(13) The method of manufacturing a positive electrode material for a lithium ion secondary battery described in (12), wherein the temperature is 400° C. or more and 800° C. or less.

DESCRIPTION OF EMBODIMENTS

The present invention is explained in detail below.

The positive electrode material for a lithium ion secondary battery of the present invention is arranged with an electrode group formed by stacking or winding negative electrode and positive electrodes via a separator, and an electrolyte in which the electrode group is immersed, the positive electrode for a lithium ion secondary battery containing a carbon black composite and olivine-type lithium iron phosphate where the carbon black composite contains ash of 1.0% or less by mass in accordance with JIS K 1469 and the positive electrode material contains 5% or more and 30% or less by mass of the carbon black composite in which fibrous carbon and carbon black are joined together, and moreover, the material contains volatile oxygen-containing functional groups which constitute 1.0% or less by mass of the positive electrode material.

In the present invention, fibrous carbon has a fibrous diameter of 5 nm or more and 50 nm or less and is comprised of a carbon nanotube having a specific surface area of 50 m$^2$/g or more and 400 m$^2$/g or less and the carbon black specific surface area is smaller than the specific surface area of the fibrous carbon and is preferably 10 m$^2$/g or more and 200 m$^2$/g or less.

The positive electrode material for the lithium ion secondary battery of the present invention contains a carbon black composite as a conductive material. The carbon black composite is comprised by fibrous carbon and carbon black being joined together and contains ash of 1.0% or less in accordance with JIS K 1469. The positive electrode material for a lithium ion secondary battery of the present invention is formed by mixing a carbon black composite and olivine-type lithium iron phosphate. However, the material may be formed by a simultaneously integrating the fibrous carbon, carbon black and olivine-type lithium iron phosphate into a single composite unit. Furthermore, a binder for a mold may also be added when forming the positive electrode material according to necessity. The olivine-type lithium iron phosphate of the present invention is not particularly limited. However, a primary particle diameter is 10 nm or more and 300 nm or less and more preferably 50 nm or more and 200 nm or less.

A positive electrode material is mainly used as a battery structural material which significantly contributes to resistance when charging and discharging a battery, an electron conduction network within the positive electrode is improved, positive electrode resistance can be reduced and large current charging and discharging is possible using the positive electrode material of the present invention.

In addition, a contact between positive electrode particles and a conductive material is maintained, the positive electrode material prevents rapid reduction in capacity or output even if the positive electrode material expands and contracts during charging and discharging.

Furthermore, an electrode resistance of the olivine-type lithium iron phosphate particle can be reduced by coating with a particle carbon layer.

The carbon black composite is comprised by joining together fibrous carbon and carbon black. The joining together of the fibrous carbon and carbon black is not merely a contact but means physically fusing using a carbon material and cannot be easily separated by a usual mechanical operation whereby there is no contact resistance between the joined fibrous carbon and carbon black and electrons can move freely. As a result, the material remains as a carbon black composite even after mixing with an active material, good dispersion properties can be obtained, high conductivity can be maintained and stable and conductivity with little variation can also be obtained.

In a single fibrous fiber, in the case of mixing with an active material and a different material, it is difficult to obtain good dispersion properties and variations in conductivity are produced due to the arrangement and entanglement between fibers. On the other hand, in a single carbon black, positive electrode resistance cannot be sufficiently reduced because conductivity is poor compared to fibrous carbon. In addition, in the case of simply mixing fibrous carbon and carbon black, the shape becomes significantly different and further larger variations are produced. Therefore, this is not suitable for the present invention.

The carbon black composite of the present invention contains ash of 1.0% by mass or less in accordance with JIS K 1469. The ash is comprised mainly of a catalyst, metal impurities (for example, Fe, Ni etc) or an oxide thereof when manufacturing the fibrous carbon. If the ash exceeds 1.0% by mass in the case of a Li ion secondary battery for example, deposition of metal onto the negative electrode occurs when charging, causing a reduction in charging and discharging capacity, the separator is broken and shorts leading to the danger of igniting which is not suitable for the present invention.

The amount of carbon black composite contained in the positive electrode material for a lithium ion secondary battery of the present invention is 5% or more and 30% or less by mass, and more preferably 8% or more and 20% or less by mass. When the contained amount is less than this, the resistance of the positive electrode can no longer be sufficiently reduced which leads to a reduction in DCR, rate characteristics and or cycle maintenance rate etc when charging and discharging a battery. When the contained amount exceeds this, improvement effects of the characteristics are no longer recognized, and because only the contained amount of the olivine-type lithium iron phosphate particles drops, the charging and discharging capacity of the battery decreases which is not suitable for this invention.

In addition to the requirements described above, the inventors discovered that the amount of volatile oxygen-containing functional groups contained in the positive electrode material contributes significantly to charging and discharging characteristics. A volatile oxygen-containing functional group is a functional group which contains a hydroxyl group (—OH), carbonyl group (>C=O), carboxyl group (—COOH), ether bond or ester bond on or near a terminal, and water ($H_2O$), carbon monoxide (CO) or carbon dioxide ($CO_2$) is released by heating. The inventors newly discovered that by controlling the amount of these volatile oxygen-containing functional groups to 1.0% by mass with respect to the positive electrode material, the conduction characteristics of the positive electrode material are improved and battery characteristics such as the DCR, rate characteristics and/or cycle maintenance rate are significantly improved. It is possible to confirm the existence of a volatile oxygen-containing functional group using a thermal desorption-gas chromatograph/mass spectrometry analysis method (TDS-GC/MS method). When the positive electrode material was analyzed using the TDS-GC/MS method, it is understood that a volatile oxygen-containing functional group exists if a mass spectrum attributable to $H_2O$ (mass number=18), carbon monoxide (mass number=28) or carbon dioxide (mass number=44) is detected when the temperature is raised to 200° C. or more. The reason for raising the temperature to 200° C. or more is because a volatile oxygen-containing functional group hardly becomes volatile when the temperature is below 200° C.

The contained amount of a volatile oxygen-containing functional group is calculated using the following formula from the mass of the positive electrode material before and after a rise in temperature when the mass spectrum described above is detected:

[contained amount of volatile oxygen-containing functional group (mass %)]=[{(mass of positive electrode material before temperature rise)–(mass of positive electrode material after temperature rise)}÷(mass of positive electrode material before temperature rise)]×100

The contained amount of the volatile oxygen-containing functional group of the positive electrode material of the present invention is 1.0% or less by mass as described above, or more preferably 0.5% or less by mass. When the contained amount exceeds 1.0% by mass, an increase in the resistance of the positive electrode material becomes significant and the battery characteristics such as DCR, rate characteristics and/or cycle maintenance rate etc decrease which is not suitable for the present invention.

The fibrous carbon used in the present invention is a carbon fiber, vapor-grown carbon fiber, carbon nanotube or carbon nanofiber etc. It is possible to appropriately select a fibrous carbon in the present invention. Because the fibrous carbon effectively transfers electrons between an active material it is preferred that the fiber diameter of the fibrous carbon is particularly small, specifically, 5 nm or more and 50 nm or less and more preferably 5 nm or more and 300 nm or less. In order to further the effectiveness of electron transfer it is preferred that an appropriate amount of fine concave and convexes exist on the surface of the fibrous carbon. It is possible to express the size of the concave and convexes as a specific surface area, and the more concave and convexes the larger the specific surface area. The specific surface area of the fibrous carbon is preferred to be 50 $m^2$/g or more and 400 $m^2$/g or less and more preferably 100 $m^2$/g or more and 300 $m^2$/g or less.

The carbon black used in the present invention performs the role of a buffer material of expansion and contraction of an active material as well as maintaining conductivity of the entire electrode, specifically, thermal black, furnace black, lamp black, channel black and acetylene black can be exemplified. Among these, acetylene black has a high purity since acetylene gas is a raw material and because acetylene gas thermal decomposition is produced by a reaction under a reductive atmosphere, there is a small combustion loss in the case of introducing fibrous carbon to an acetylene black production site to form a composite which is preferable.

The inventors newly discovered that positive electrode resistance decreases, and DCR, rate characteristics and/or cycle maintenance is improved when charging and discharging a battery in the case where the specific surface area of a carbon black included in a composite material is appropriately small, moreover, smaller than the specific surface area value of a fibrous carbon. While the reason for this is not clear, it is presumed that contact properties of the surface of a carbon black which is a partner material of a fibrous carbon in which fine concave and convexes exist on the surface as described above, improves when the surface is somewhat smooth rather than having fine concave and convexes. In the present invention, the specific surface are of the carbon black is smaller than the specific surface are of the fibrous carbon and is preferably 10 $m^2$/g or more and 200 $m^2$/g or less.

The ratio of fibrous carbon and carbon black included in the positive electrode material of the present invention is preferred to be 70:30 to 5:95 by mass ratio (the ratio of carbon black with respect to fibrous carbon is 30/70 or more and 95/5 or less). When the ratio of fibrous carbon increases, it is difficult for the buffer material function of carbon black to be demonstrated, that is, buffer of the expansion and contraction of an active material. On the other hand, when the ratio of fibrous carbon decreases, effective transfer of electrons between the active material and the fibrous carbon becomes difficult due to a lack of fibrous carbon.

A carbon black composite refers to the joining together of fibrous carbon and carbon black. A manufacturing method of a carbon black composite is not particularly limited, for example, a method of forming a composite by introducing fibrous carbon during thermal decomposition of a hydrocarbon, a method of forming a composite by supplying a hydrocarbon including fibrous carbonization catalyst during thermal decomposition of acetylene gas and/or in a state where the acetylene is thermally decomposed (Japanese Translation of PCT International Application 2009-503182), a method of dispersing fibrous carbon and carbon black in a carbonization raw material solution such as a hydrocarbon or alcohol and carbonizing by an operation such as heating when the carbonization raw material solution is in a liquid or gas state, or a method of forming a composite of fibrous carbon and carbon black by a mechanochemical means using a solid medium. Forming a composite using a mechanochemical means refers to the use of a medium blade type mixer such as a bead mill, vibration mill or ball mill.

Furthermore, a positive electrode material is formed using a carbon black composite and olivine-type lithium iron phosphate. Positive electrode formation is performed by mixing the carbon black composite and olivine-type lithium iron phosphate using a mixer such as a Raikai mixer (stone mill), a universal mixer, a Henschel mixer or ribbon blender or medium blade type mixer such as a bead mill, vibration mill or ball mill. It is preferred to add a liquid medium to these components and perform wet type mixing in order to form a state where the carbon black composite and olivine-type lithium iron phosphate are well mixed together. Furthermore, it is possible to simultaneously form the carbon black composite and positive electrode material by adding while mixing olivine-type lithium iron phosphate to the fibrous carbon and carbon black in the case of adopting a mechanochemical means as a method of forming a carbon black composite.

Furthermore, following this, the contained amount of a volatile oxygen-containing functional group of the positive electrode material for a lithium ion secondary battery is reduced to 1.0% or less by mass. A specific method of this reduction includes heating the positive electrode material comprising the carbon black composite and olivine-type lithium iron phosphate created in the method described above at a temperature of 200° C. or more and 900° C. or less under a vacuum or inactive atmosphere. Electric furnaces such as a pipe shaped furnace, atmosphere furnace or muffle furnace can be used for heating. When the atmosphere is a vacuum, the pressure of the interior of the electric furnace may be maintained to about 10 Pa or less using a general rotation type vacuum pump. When the atmosphere is an inactive atmosphere, the interior of the electric furnace may be filled with an inactive gas such as nitrogen or argon etc. The positive electrode material discharges the volatile oxygen-containing functional group while being heated, however, when the interior of the electric furnace is filled with a gas including a volatile oxygen-containing functional group, discharge from the positive electrode material following this is impaired. It is preferred to exhaust a gas which includes a produced volatile oxygen-containing functional group using a method of continuously operating the vacuum pump until heating is completed in the case of making the furnace interior a vacuum or a method of continuously passing an inactive gas through the furnace until heating is completed when making the furnace interior an inactive atmosphere in order to prevent filling the furnace interior.

The heating temperature is preferred to be 200° C. or more and 900° C. or less or more preferably 400° C. or more and 800° C. or less. When the heating temperature is less than 200° C. the effects of the volatile oxygen-containing functional group are hardly demonstrated since the temperature is too low. When the temperature exceeds 900° C. not only can the effects of volatility acceleration by heating no longer be obtained but the olivine-type lithium iron phosphate may be thermally decomposed which is not suitable for the present invention. Furthermore, although heating time is not particularly limited, it is preferred to be 30 minutes or more and 5 hours or less.

The positive electrode material of the present invention is used in a lithium ion secondary battery as a positive electrode molded on an electrode plate such as aluminum. A separator, electrolyte or negative electrode material may be used as an alternative material used for the lithium ion secondary battery. A separator electrically insulates the positive and negative electrodes and maintains an electrolyte and a synthetic resin such as polyethylene or polypropylene can be used. A porous film shaped material is preferred to be used for improving the maintaining properties of the electrolyte.

In addition, it is preferred that a non-aqueous electrolyte which includes lithium salt or an ion conductor polymer is used as the electrolyte in which the electrode group is immersed in the lithium secondary battery which uses the positive electrode material of the present invention. Ethylene carbonate (EC), propylene carbonate (PC), diethyl carbonate (DEC), dimethyl carbonate (DMC), methyl ethyl carbonate (MEC) etc can be used as a non-aqueous solution of the non-aqueous electrolyte which includes lithium salt. In addition, lithium hexafluorophosphate ($LiPF_6$), lithium tetrafluoroborate ($LiBF_4$), or lithium trifluoromethanesulfonate ($LiSO_3CF_3$) may be used as the lithium salt which is dissolved in the non-aqueous solution.

It is possible to reversibly absorb and discharge lithium ion the same as the positive electrode as the negative electrode material, and a material which has poor reactivity with an electrolyte and has a lower oxidation-reduction potential than the positive electrode material is preferred, for example, graphite or lithium titanate etc.

EXAMPLES

The positive electrode material for a lithium secondary battery related to the present invention is explained in detail below using examples and comparative examples. However, the present invention is not limited to the following examples in as far as the idea of the invention is not exceeded.

Example 1

An ethanol slurry containing 2% by mass of a carbon black (manufactured by Showa Denko, VGCF-X, fiber diameter: 15 nm, specific surface are: 260 $m^2$/g) was sprayed into the interior of a high frequency heating furnace heated to 200° C. using nitrogen as a carrier gas while simultaneously introducing acetylene gas to the furnace interior. At this time, the amount of acetylene introduced was adjusted so that the mass ratio of carbon nanotubes within the slurry and carbon particles (carbon black) produced by thermal decomposition of the ethanol and acetylene became 10:90. After the product was cooled and collected, it was subjected to observation using a transmission type electron microscope (TEM). The TEM observation was performed using a transmission type electron microscope 2000FX manufactured by JEOL under conditions of an acceleration voltage of 200 kV and observation magnification of 200,000. It was confirmed that fiber shaped carbon nanotubes and the carbon black (particle diameter 50 nm) produced by thermal decomposition of the ethanol and acetylene mutually and continuously existed and a composite was formed. The ash in the carbon black composite was measured at 0.1% by mass using a JIS K 1469 method. The specific surface area of the composite was measured at 240 $m^2$/g using a BET one point method using an automatic specific surface area measuring device (manufactured by Microdata, Microsorp 423211). The specific surface area value of the carbon black was calculated at 60 $m^2$/g from the specific surface area value between the carbon nanotubes and composite, and the mass ratio between the carbon nanotubes and carbon black.

20 g of the carbon black composite and 80 g of olivine-type lithium iron phosphate (Manufactured by Mitsui Engineering and Shipbuilding, primary particle diameter 85 nm) were mixed for 8 hours using a Raikai mixer and a positive electrode material mixture was formed. 50 g of this mixture was filled into a tube shaped furnace and heated at 300° C. for 2 hours while maintaining the furnace pressure at 1 to 5 Pa using an oil rotation type vacuum pump and a positive electrode material was formed. The positive electrode material was collected after cooling and its weight was measured at 49.5 g. A mass spectrum of a volatile oxygen-containing functional group of the positive electrode material attributable to water (mass number=18) and carbon dioxide (mass number=44) was slightly detected using a thermal desorption-gas chromatograph/mass spectrometry analysis method (TDC-GC/MS method) using a temperature programmed desorption device (manufactured by Agilent Technologies, Double Shot Pyrolyzer 78683B), gas chromatography (manufactured by Hewlett Packard, HP6890) and mass spectrometer (manufactured by Hewlett Packard, 5973). 10 g of the positive electrode material was heated in an electric furnace under the same conditions (heated under a rising temperature speed of 25° C./minute up to 800° C. under a vacuum) as the temperature programmed desorption device and the weight change before and after heating was measured, and the contained amount of a volatile oxygen-containing functional group was measured at 6% by mass by calculating a reduced weight amount using the formula;

[contained amount of volatile oxygen-containing functional group (mass %)]=[{(mass of positive electrode material before temperature rise)−(mass of positive electrode material after temperature rise)}÷(mass of positive electrode material before temperature rise)]×100

The powder resistance value of the positive electrode material was measured at 2.51 Ω·cm using a JIS K 1469 method.

Example 2

2 g of carbon nanotubes (manufactured by Mitsubishi Materials Electronic Chemicals, CNF-T, fiber diameter: 20 nm, specific surface are: 220 m²/g, ash: 0.6% by mass), 8 g of acetylene black (manufactured by DENKI KAGAKU KOGYO, HS-100, specific surface are: 40 m²/g, ash: 0.01% by mass) and 90 g of olivine-type lithium iron phosphate (manufactured by PHOSTECH LITHIUM INC., primary particle diameter 200 nm) were added to 1 liter of ethanol, and a mechanochemical composite formation of carbon nanotubes and acetylene black and a mixing with olivine-type lithium iron phosphate was simultaneously performed by wet type stirring for 5 hours using a vibration mill using a blade medium comprised from an aluminum ball. After stirring, the ethanol was removed using a filter, dried for 3 hours at 100° C. using a drier, and cracked for 8 hours using a Raikai mixer to form a positive electrode material mixture. 50 g of this mixture was filled into a muffle furnace and heated at 700° C. for 1 hour while passing a nitrogen gas and a positive electrode material was formed. The positive electrode material was collected after cooling and its weight was measured at 48.5 g. A significant mass spectrum of a volatile oxygen-containing functional group of the positive electrode material was not detected using a TDC-GC/MS method. 10 g of the positive electrode material was heated in an electric furnace under the same conditions as the temperature programmed desorption device and the weight change before and after heating was measured, and the contained amount of a volatile oxygen-containing functional group was measured at 0.05% by mass by calculating a reduced weight amount. The powder resistance value of the positive electrode material was measured at 3.75 Ω·cm.

The ash amount in the carbon black composite, contained amount of carbon black within the positive electrode material and mass ratio of carbon nanotubes and acetylene black were each calculated from the compound ratios of the initial raw materials at 0.13% by mass, 10% by mass and 20:90 respectively.

Example 3

Apart from 10 g of carbon nanotubes, 5 g of acetylene and 35 g of olivine-type lithium iron phosphate, the positive electrode material mixture was formed exactly the same as in example 2. 50 g of this mixture was filled into a tube shaped furnace and heated at 500° C. for 20 minutes while passing an argon gas and a positive electrode material was formed. The positive electrode material was collected after cooling and its weight was measured at 49 g. A mass spectrum of a volatile oxygen-containing functional group attributable to carbon dioxide (mass number=44) of the positive electrode material was slightly detected using a TDC-GC/MS method. 10 g of the positive electrode material was heated in an electric furnace under the same conditions as the temperature programmed desorption device and the weight change before and after heating was measured, and the contained amount of a volatile oxygen-containing functional group was measured at 0.1% by mass by calculating a reduced weight amount. The powder resistance value of the positive electrode material was measured at 3.18 Ω·cm.

The ash amount in the carbon black composite, contained amount of carbon black within the positive electrode material and mass ratio of carbon nanotubes and acetylene black were each calculated from the compound ratios of the initial raw materials at 0.40% by mass, 30% by mass and 67:33 respectively.

Example 4

Apart from using carbon nanotubes different to CNF-T (manufactured by Showa Denko, VGCF-S, fiber diameter: 80 nm, specific surface area: 43 m²/g, ash: 0.7% by mass) the positive electrode material mixture was formed exactly the same as in example 2. The positive electrode material was collected after cooling and its weight was measured at 48.2 g. A significant mass spectrum of a volatile oxygen-containing functional group of the positive electrode material was not detected using a TDC-GC/MS method. 10 g of the positive electrode material was heated in an electric furnace under the same conditions as the temperature programmed desorption device and the weight change before and after heating was measured, and the contained amount of a volatile oxygen-containing functional group was measured at 0.8% by mass by calculating a reduced weight amount. The powder resistance value of the positive electrode material was measured at 3.68 Ω·cm.

The ash amount in the carbon black composite, contained amount of carbon black within the positive electrode material and mass ratio of carbon nanotubes and acetylene black were each calculated from the compound ratios of the initial raw materials at 0.15% by mass, 10% by mass and 20:80 respectively.

Example 5

The same as example 2, mechanochemical composite formation of carbon nanotubes and acetylene black and a mixing with olivine-type lithium iron phosphate were simultaneously performed, and after filtering and drying, the positive electrode material was formed by cracking for 8 hours using a Raikai mixer. Following this, unlike example 2, heating was performed in nitrogen for 30 minutes at 900° C. and using the same following processes in example 2 and the positive electrode material is obtained. A significant mass spectrum of a volatile oxygen-containing functional group of the positive electrode material was not detected using a TDC-GC/MS method. 10 g of the positive electrode material was heated in an electric furnace under the same conditions (heated under a rising temperature speed of 25° C./minute up to 800° C. under a vacuum) as the temperature programmed desorption device and the weight change before and after heating was measured, and the contained amount of a volatile oxygen-containing functional group was measured at 0.5% by mass by calculating a reduced weight amount. The powder resistance value of the positive electrode material was measured at 5.78 Ω·cm using a JIS K 1469 method. The ash amount in the carbon black composite, contained amount of carbon black within the positive electrode material and mass ratio of carbon nanotubes and acetylene black calculated from the compound ratios of the initial raw materials were the same as in example 2.

Examples 6 to 10

A coin battery was created using the positive electrode material in examples 1 to 5 and charging and discharging characteristics were evaluated. An example of the positive electrode and coin battery creation method is shown below. The positive electrode material in examples 1 to 3 was used as a positive electrode material using poly(vinylidene fluoride) (manufactured by KUREHA, KF polymer solution) as an adhesive. N-methylpyrrolidone (manufactured by Aldrich) was added to this as a dispersion solution and a kneaded positive electrode binder (slurry) was created. The positive electrode binder slurry was coated in a 20 μm thick aluminum foil, dried, pressed and cut, and a positive electrode for a lithium secondary battery was obtained. Metal lithium (manufactured by Honjo Metal) was used for an opposite electrode and an olefin fiber non-woven fabric was used as separator to electrically separate the electrodes. A CR-2032 type coin battery was created using 1 mol/L of lithium hexafluorophosphate (LiPF$_6$) dissolved in a solution mixed with EC (ethylene carbonate, manufactured by Aldrich) and MEC (methyl ethyl carbonate, manufactured by Aldrich) at a volume ratio of 30:70 in an electrolyte.

As an experiment of the discharge capability of the battery, after initially charging the battery and confirming that the charging and discharging efficiency was close to 100%, discharge capacity was measured when a constant current discharge of 2.1V was performed at a current density of 0.7 mA/cm$^2$, and capacity density (mAh/g) was calculated by subtracting the positive electrode active mass. The current value which this capacity (mAh) could be charged and discharged at 1 hour was set at [1 C].

Following this, as a cycle capability experiment, in a cycle experiment where cycles of charge 2 C constant current (after reaching 4.1V and when charging with a current of 0.05 is complete), and discharge 2 C constant current up to 2.1 V were performed with 10 minute rest intervals between each respectively for 50 cycles, the capacity ratio (%) of the 50$^{th}$ cycle with respect to the discharge capacity of the first cycle was defined as the discharge capacity maintenance ratio. In addition, following an initial charge and discharge, charging of 4.1V (0.2 C constant current, 0.05 C current is complete) and discharging at a current value was increased gradually by 0.2 C, 0.33 C, 0.5 C, 1.0 C (constant current, compete at 2.1V) for each cycle with 10 minute rest intervals were performed respectively, and a rate (%) of discharge capacity ratio 1.0 C with respect to discharge capacity 0.2 C was defined as a rate characteristic. Furthermore, direct current resistance (DCR) of the battery was calculated from the I-V characteristics when SOC (charge depth) was at 50%. The direct current resistance when charged was defined as "charged DCR" and the direct current resistance when discharged was defined as "discharged DCR". These results are summarized in table 1.

TABLE 1

| Class | Used positive electrode material | Capacity maintenance ratio (%) | Rate characteristic (%) | Discharge d DCR (Ω) | Charged DCR (Ω) |
|---|---|---|---|---|---|
| Example 6 | Example 1 | 97.6 | 97.0 | 67.9 | 68.4 |
| Example 7 | Example 2 | 98.3 | 93.1 | 91.4 | 87.3 |
| Example 8 | Example 3 | 98.2 | 95.4 | 78.9 | 81.2 |
| Example 9 | Example 4 | 94.3 | 90.6 | 123.5 | 116.9 |
| Example 10 | Example 5 | 92.8 | 90.0 | 139.0 | 131.2 |
| Comparative example 3 | Comparative example 1 | 75.4 | 81.5 | 367.9 | 470.6 |
| Comparative example 4 | Comparative example 2 | 32.1 | 43.4 | 640.0 | 834.1 |

Comparative Example 1

The same in example 1, a composite of carbon nanotubes and carbon black and olivine-type lithium iron phosphate were mixed for 8 hours using a Raikai mixer and a positive electrode material mixture was formed. Following this, unlike example 1 the positive electrode material was obtained without performing heating in a vacuum. A mass spectrum of a volatile oxygen-containing functional group of the positive electrode material attributable to water (mass number=18) and carbon dioxide (mass number=44) was significantly detected using TDC-GC/MS method. 10 g of the positive electrode material was heated in an electric furnace under the same conditions (heated under a rising temperature speed of 25° C./minute up to 800° C. under a vacuum) as the temperature programmed desorption device and the weight change before and after heating was measured, and the contained amount of a volatile oxygen-containing functional group was measured at 1.2% by mass by calculating a reduced weight amount. The powder resistance value of the positive electrode material was measured at 10.86 Ω·cm using a JIS K 1469 method.

Comparative Example 2

The same as example 2, mechanochemical composite formation of carbon nanotubes and acetylene black and a mixing with olivine-type lithium iron phosphate were simultaneously performed, and after filtering and drying, the positive electrode material was formed by cracking for 8 hours using a Raikai mixer. Following this, unlike example 2, heating was performed in nitrogen for 1 hour at 150° C. and using the same following processes in example 2 the positive electrode material.

A mass spectrum of a volatile oxygen-containing functional group of the positive electrode material attributable to water (mass number=18) and carbon dioxide (mass number=44) was significantly detected using a TDC-GC/MS method. 10 g of the positive electrode material was heated in an electric furnace under the same conditions (heated under a rising temperature speed of 25° C./minute up to 800° C. under a vacuum) as the temperature programmed desorption device and the weight change before and after heating was measured, and the contained amount of a volatile oxygen-containing functional group was measured at 1.9% by mass by calculating a reduced weight amount. The powder resistance value of the positive electrode material was measured at 23.86 Ω·cm using a JIS K 1469 method.

Comparative Examples 3 to 4

A coin battery was created the same as in examples 6 to 10 using the positive electrode material in comparative examples 1 to 2 and its charging and discharging characteristics were evaluated and the results are shown in table 1.

Comparative Example 5

2 g of carbon nanotubes (manufactured by ILJIN, CM-95, fiber diameter: 20 nm, specific surface area: 170 m²/g, ash: 4.1% by mass) and 8 g of carbon black (manufactured by Tokai Carbon, SEAST NH, specific surface area: 74 m²/g, ash: 0.3% by mass) instead of acetylene black were mixed using a mortar and the ash was measured at 1.1% by mass using a JIS K 1469 method.

2 g the carbon nanotubes, 8 g of carbon black and 90 g of olivine-type lithium iron phosphate (manufactured by PHOSTECH LITHIUM INC., primary particle diameter 200 nm) were added to 1 liter of ethanol, and a positive electrode material was created exactly the same as in example 2. Following this, a coin battery was formed the same as in examples 4 to 6, and the charging and discharging characteristics were evaluated. In a 2 C charge/2 C discharge cycle capability experiment, capacity decreased rapidly from the 20$^{th}$ cycle and charging and discharging became impossible. When the battery was taken apart, lithium dendritic crystals were growing from opposite electrode surfaces and it was observed that the separator was broken.

The same as example 2, mechanochemical composite formation of carbon nanotubes and acetylene black and a mixing with olivine-type lithium iron phosphate were simultaneously performed, and after filtering and drying, the positive electrode material mixture was formed by cracking for 8 hours using a Raikai mixer. Following this, unlike example 2, heating was performed in nitrogen for 1 hour at 1000° C., and it was observed in a powder X ray diffraction measurement that the olivine-type lithium iron phosphate was significantly broken down and iron phosphide ($Fe_2P$) was produced. $Fe_2P$ does not have a function as a positive electrode active material for a lithium ion secondary battery.

While the positive electrode material for a lithium ion secondary battery of the present invention is expected to be thermally stable and have a high level of safety, it is possible to provide the positive electrode material with excellent conduction properties not present in the conventional technology while using olivine-type lithium iron phosphate which has the demerit of a high resistance value as a positive electrode active material. Using the positive electrode material of the present invention, the demerit of olivine-type lithium iron phosphate is solved and as a result, it is possible to repeat large current charging and discharging at a high capacity, and moreover, realize a lithium ion secondary battery having a high level of safety. The lithium ion secondary battery which uses the positive electrode material of the present invention can be favorably used for purposes where large current charging and discharging is required such as electric power tools or hybrid cars.

An electron conduction network is improved by using a positive electrode material for a lithium ion secondary battery of the present invention and moreover it is possible to reduce positive electrode resistance and large current charging and discharging becomes possible by smooth reception of electrons between an olivine-type lithium iron phosphate and a carbon black composite which is a conductive material, and reception of electrons between the carbon black composite and a metal electric collector.

In addition, a positive electrode material for a lithium ion secondary battery of the present invention can improve and maintain a contact between positive electrode particles and a conductive material, prevent rapid reduction in capacity or output even if positive electrode particles (olivine-type lithium iron phosphate particles) expand and contract during charging and discharging.

What is claimed is:

1. A positive electrode material for a lithium ion secondary battery comprising:
   5% by mass or more and 30% by mass or less of a carbon black composite formed by joining together fibrous carbon and carbon black wherein ash is 1.0% or less by mass in accordance with JIS K 1469;
   olivine-type lithium iron phosphate; and
   a volatile oxygen-containing functional group, wherein the volatile oxygen-containing functional group is present and constitutes at most 1.0% by mass of the positive electrode material.

2. The positive electrode material for a lithium ion secondary battery according to claim 1, wherein the fibrous carbon is a carbon nanotube having a fiber diameter of 5 nm or more and 50 nm or less and a specific surface area of 50 m²/g or more and 400 m²/g or less.

3. The positive electrode material for a lithium ion secondary battery according to claim 1, wherein a specific surface area of the carbon black is less than the specific surface area of the fibrous carbon and is 10 m²/g or more and 200 m²/g or less.

4. The positive electrode material for a lithium ion secondary battery according to claim 1, wherein a ratio of the carbon black with respect to the contained fibrous carbon is a mass ratio of 30/70 or more and 95/5 or less.

5. The positive electrode material for a lithium ion secondary battery according to claim 1, wherein a primary particle diameter of the olivine-type lithium iron phosphate is 10 nm or more and 300 nm or less.

6. The positive electrode material for a lithium ion secondary battery according to claim 1, wherein a primary particle diameter of the olivine-type lithium iron phosphate is 50 nm or more and 200 nm or less.

7. The positive electrode material for a lithium ion secondary battery according to claim 1, wherein the amount of the carbon black composite is 8% to 20% by mass.

8. The positive electrode material for a lithium ion secondary battery according to claim 1, wherein the fibrous carbon is a carbon nanotube having a fiber diameter of 5 nm or more and 30 nm or less and a specific surface area of 100 m²/g or more and 300 m²/g or less.

9. The positive electrode material for a lithium ion secondary battery according to claim 1, wherein the carbon black is acetylene black.

10. A lithium ion secondary battery comprising:
a positive electrode formed by using a positive electrode material for a lithium ion secondary battery comprising:
5% by mass or more and 30% by mass or less of a carbon black composite formed by joining together fibrous carbon and carbon black wherein ash is 1.0% by mass in accordance with JIS K 1469;
olivine-type lithium iron phosphate; and
a volatile oxygen-containing functional group, wherein the volatile oxygen containing functional group is present and constitutes at most 1.0% by mass of the positive electrode material;
a negative electrode;
an electrolyte; and
a separator which insulates the positive electrode and the negative electrode and which retains the electrolyte.

11. The lithium ion secondary battery according to claim 10, wherein the separator is a porous film shape.

* * * * *